Feb. 16, 1954      K. GREULICH      2,669,215
SENSITIVE INDICATING ELECTRIC METER
Filed Oct. 9, 1951
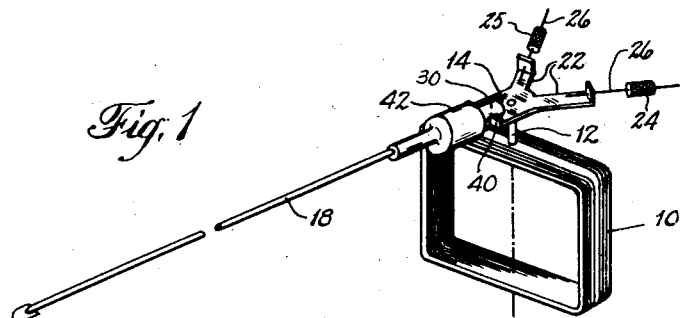
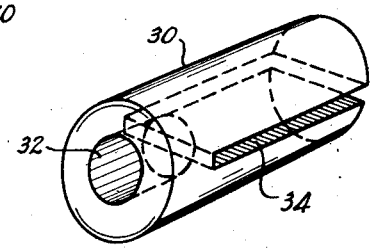
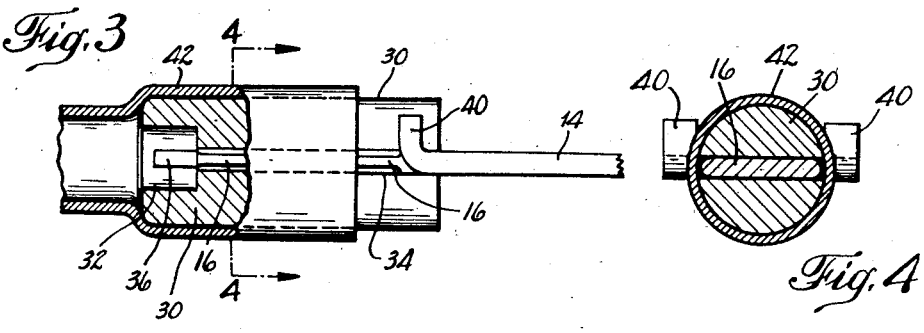
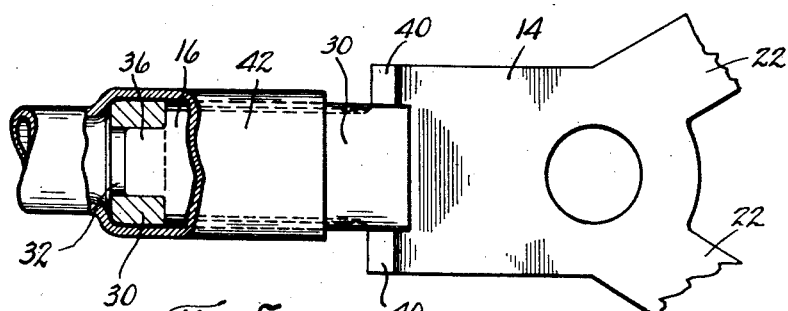
INVENTOR:
KARL GREULICH
BY
Morgan, Finnegan & Durham
ATTORNEYS.

Patented Feb. 16, 1954

2,669,215

UNITED STATES PATENT OFFICE 2,669,215

SENSITIVE INDICATING ELECTRIC METER

Karl Greulich, Frankfurt am Main, Germany, assignor to Landis & Gyr, A. G., a corporation of Switzerland Application October 9, 1951, Serial No. 250,539

2 Claims. (Cl. 116—136.5)

Sensitive indicating electric metering apparatus, such as suspended loop meters (Fallbügelgeräte), require special care in the mounting and arrangement of the indicating pointers used in such apparatus. The indicator must be well insulated from the remainder of the instrument, must not influence the accuracy of the apparatus, must be durable, light in weight and simple in construction. All of these requirements are not satisfactorily met by the apparatus of the prior art.

Heretofore, in many cases, the cross or hub-portion of the instrument, being the multiple-arm part which carries the indicating pointer and the balancing weights and is attached to the axle of the measuring system together with the coil of the system, is provided with a tube forming the support for the pointer, the tube being spaced from the indicator arm on the hub by means of a tubular sleeve of bone. Into opposite ends of the sleeve, the pointer supporting tube and the indicator arm are inserted without touching each other at their adjacent ends. The pointer tube and the indicator arm and coil are thus insulated from each other by the bone sleeve mechanically connecting them.

Such an arrangement, however, results in a spacing of the mass or the pointer and tube away from the axis of the system thereby increasing the mass of the system, increasing the weight needed to balance the pointer and causing a general reduction in the sensitivity of the system, error in deflection and consequent errors in the indicated readings of the instrument. Such a system is also undesirable as the bone sleeve is often subject to bursting after a time, and the pointer may also be angularly displaced with respect to the axis of the pivotal mounting for the system thereby increasing the error of the indication.

Another previously used arrangement which does not avoid unbalance of the system has been achieved with the use of glass insulation, the tubes being mounted on the indicator cross head and on the indicator by means of diamond dies. This method is very expensive, time consuming and the glass rods frequently burst. Various diameters and the rough uneven surfaces of the glass rods require diamond drawing dies of the smallest gradations, thereby further increasing the cost of such constructions.

Stampings have also been used for the purpose of insulating the parts from each other but this expedient has also resulted in great unbalance due to the projection of the weights from the axis of the system.

The present invention has for its object the provision of a novel and improved pointer mounting for sensitive electrical measuring instruments, which is simple, relatively inexpensive, durable and of great accuracy.

Of the drawings:

Figure 1 is a fragmentary perspective view of an improved indicator system in accordance with the present invention, showing the present preferred embodiment of the present invention;

Figure 2 is a perspective view of an insulating member used in the form shown in Figure 1;

Figure 3 is a fragmentary side elevation, with many parts broken away, of the insulating connection between the pointer tube and indicator arm;

Figure 4 is a sectional view taken on the line 4—4 of Figure 3; and

Figure 5 is a top plan view of the parts shown in Figure 3 with certain parts broken away.

Figure 1 shows a general perspective view of a preferred form of indicator system in accordance with the present invention and comprises a coil member 10 fixed to a shaft 12 formnig the axis of the indicating system of the meter, the shaft 12 also being fixed to a cross of hub member 14 from which extends forwardly an indicator arm 16, on which the pointer supporting tube 18 and pointer 20 are supported, while the system is balanced by means of the rearwardly extending arms 22 supporting the balance weights 25 which are adjustably threaded on the screws 26.

The pointer 20 and its supporting tube 18 are insulated from the coil 10 and the hub member 14 by means of the insulating member shown in Figure 2. This insulating member comprises a piece of bone, ivory or other relatively strong, durable insulating material 30 of a generally cylindrical form, relatively long with respect to its diameter and formed at one end with a central cylindrical aperture 32 which extends interiorly of the piece 30 and intersects with a relatively long diametral slot 34 extending inwardly from the other end of the insulating piece 30.

Hub member 14 formed with the forwardly extending indicator arm 16 is adapted to enter the slot 34, the indicator arm being slightly less in width than the diameter of the piece 30, and formed at its extreme front end with a reduced portion 36 which is adapted to enter and snugly fit the cylindrical bore 32, but being short enough so that it does not project beyond the end of the cylindrical piece 30. At the junction of the reduced portion 36 and the arm 16 is formed a shoulder which engages the inner junction of the cylindrical bore 32 and the slot 34 thereby limiting the relative movement of the arm 16 into the piece 30. The arm 16 is preferably slightly thinner than the slot 34 intermediate the ends of the slot 34 so that a layer of a suitable adhesive, such as shellac may be used to hold the arm and piece 30 in their assembled relation.

Preferably, the arm 16 is formed with upturned ears 40 spaced apart a distance equal to the diameter of the piece 30 so that the piece 30 is accurately centered with respect to the arm 16. In case the ears 40 are omitted, the parts may be assembled in a suitable fixture.

The rear end of the pointer supporting tube is formed as an enlarged portion 42 of the tube with a shoulder where the enlarged portion is joined to the main portion of the tube 18, the interior of the enlarged portion 42 being of a size to fit snugly over the exterior of the bone piece 30 and to be secured thereto by a coating of shellac or other suitable insulating adhesive material. The enlarged portion 42 is of a length somewhat shorter than the piece 30 so that when the shoulder has been fully seated against the forward end of the piece 30 the rear end of 42 cannot come in contact with the indicator arm 16.

When assembled, the indicating system of the present invention avoids excessive weight. The weight of the insulation of the pointer system is closely adjacent the pivotal axis, thereby reducing the weight of the balancing weights and leading to an overall reduction in the weight of the pivotally mounted parts, resulting in increased accuracy of the meter. The parts have great strength as the relatively brittle insulation is encased within the tubular portion of the pointer, and the indicator arm is prevented from turning in the insulation member, thereby avoiding displacement of the pointer.

The invention in its broader aspects is not limited to the specific mechanisms shown and described but departures may be made therefrom within the scope of the accompanying claims without departing from the principles of the invention and without sacrificing its chief advantages.

What is claimed is:

1. In a sensitive electrical measuring instrument, the combination of a hub member having an indicator arm projecting therefrom, the arm having opposite flat sides, an insulating sleeve having a diametral slot snugly fitting the flat sides of the arm, the arm having a reduced end portion and the insulating sleeve having a reduced aperture into which the reduced end portion is snugly fitted to center the arm on the sleeve, and a pointer supporting tubular member snugly fitted to the exterior of the insulating sleeve and spaced from the indicator arm by means of the sleeve, the diameter of the sleeve being slightly larger than the width of the arm.

2. An instrument as claimed in claim 1 in which the insulating sleeve is formed with its diametral slot and reduced aperture centrally alined in the sleeve and extending inwardly from opposite ends of the sleeve with the reduced end portion of the arm abutting the junction of the slot and reduced aperture.

KARL GREULICH.

References Cited in the file of this patent
UNITED STATES PATENTS

| Number | Name | Date |
|---|---|---|
| 2,264,726 | Stickney | Dec. 2, 1941 |